(12) United States Patent
Hirschman et al.

(10) Patent No.: US 6,293,673 B1
(45) Date of Patent: Sep. 25, 2001

(54) PULL-DOWN MEMBER FOR AN EYEGLASS FRAME WITH IMPROVED COUPLING PIN

(75) Inventors: Jason Hirschman, Bohemia, NY (US); Chul Woo Shin, Masan (KR)

(73) Assignee: Pareto Corporation, Henderson, NV (US)

( * ) Notice: Subject to any disclaimer, the term of this patent is extended or adjusted under 35 U.S.C. 154(b) by 0 days.

(21) Appl. No.: 09/593,858

(22) Filed: Jun. 14, 2000

(51) Int. Cl.$^7$ .................................................. G02C 5/14
(52) U.S. Cl. ........................................ 351/123; 351/119
(58) Field of Search .................................. 351/119, 118, 351/123, 111

(56) References Cited

U.S. PATENT DOCUMENTS 4,790,645 * 12/1988 Gish ...................................... 351/119
5,623,322 * 4/1997 Hirschman et al. .................. 351/119

* cited by examiner

*Primary Examiner*—Huy Mai
(74) *Attorney, Agent, or Firm*—Ostrolenk, Faber, Gerb & Soffen, LLP

(57) ABSTRACT

An eyeglass frame includes two temples and a pull-down member rotatably and ratchedly attached in an opening of the distal end of each temple. Each pull-down member is movable with respect to the end-piece at a series of discrete angles, and thereby provides a snug fit of the eyeglass frame on the user's face. The pull-down member includes a core with a central opening defined by a series of teeth. A pin having a complementary series of teeth along an outer surface thereof engages the toothed opening of the core to provide the pivotable and ratchetable displacement of the pull-down member relative to the end-piece of the frame temple. The pin has a top portion with an adjustment protrusion extending therefrom and a bottom portion which covers the opening of the end piece.

26 Claims, 6 Drawing Sheets

PULL-DOWN MEMBER FOR AN EYEGLASS FRAME WITH IMPROVED COUPLING PIN

BACKGROUND OF THE INVENTION

The present invention relates to eyeglass frames, and more particularly to a pull-down member attached to an eyeglass frame through a pin, which protects against the inclusion of foreign objects and which assures reliable frictional engagement between the pin and an eyeglass temple.

It is very inconvenient when eyeglasses slip down the nose of the user and have to be continuously adjusted on the user's face. This is not only inconvenient, but particularly hazardous when it comes to safety glasses. If safety glasses are not continuously positioned atop the user's nose so as to adequately protect the eyes, injury can occur from flying objects and debris because the eyes were not properly shielded.

This problem of eyeglasses slipping down the user's nose is a very common occurrence in warm weather, but also occurs when the user is involved in a physically demanding activity. It is under these circumstances that a user is most vulnerable to injury even though he or she is wearing safety glasses, if those safety glasses are not properly positioned on the user's face and retained in such position.

The slippage of eyeglasses from the user's nose can also counter the positive effect of ultraviolet protection offered by many eyeglass lenses. Eyecare professionals, as well as eyeglass users, are concerned about the harmful effects ultraviolet radiation can have on the eyes, and in particular its possible linkage to cataracts and other eye diseases. Most optical laboratories offer ultraviolet protection for their lenses. However, if eyeglasses slip as little as one-quarter of an inch (approximately six millimeters) down the user's nose, a significant amount of ultraviolet radiation could be incident on the user's eyes. If the eyeglasses slip as much as one inch down the nose, then almost all the ultraviolet protection provided by the lenses is ineffective and virtually all the ultraviolet light strikes the eyes.

Approximately 60 percent of the eyeglass wearing population wears multifocal lenses, such as bifocals, trifocals, etc. The position of the segments of these multifocal lenses is critical and varies with the type of lenses, as well as the position of the user's eyelids in relation to the eyeglass frame. If the user's glasses slide one quarter of an inch, the position of a pair of bifocals may be displaced 100 percent from where the segments should be positioned. By looking through the incorrect segments of multifocal lenses, an individual may not only be inconvenienced, but could be injured because of impaired vision.

The displacement of eyeglasses worn by sportsmen also poses problems, especially with respect to sporting glasses specialized for fisherman, cyclists or golfers. With respect to each of these sports, as well as many others, individuals complain about their eyeframes falling off or sliding down their noses. Fisherman often lose their glasses in the water, golfers cannot tolerate the slightest movement of their eyeglasses, and cyclists do not like to risk moving their hands to push their glasses back into position. Thus, there are numerous and very real problems associated with the displacement of eyeglasses from their proper position on the user's face.

To rectify these problems, devices such as elastic or elasticized bands are attached from one end of an eyeglass temple to the other end to retain the eyeglasses on the user's face. However, these elastic bands are often uncomfortable and cause the eyeglasses to rub against the user's nose and ears causing irritation. Also, it is very common that when one wishes to employ such elastic bands or straps, they cannot be found or located because they are not a permanent attachment to the eyeglasses. Since these elastic straps or bands are relatively inconspicuous, they are easily lost or misplaced at a time when they are most needed. While it is not uncommon to see athletes and workers use these elastic bands, there are nonetheless many disadvantages inherent with their use.

The problem of eyeglass slippage has for many years been addressed by the use of what has commonly been known as "cable temples" or "curl temples." These temples simply wrap around the ear. Originally, such temples were made of metal, but in more recent years they have been covered with plastic or silicon, and in some applications are completely fabricated from plastic. However, the problem with cable temples is that most eyeglass users find them uncomfortable. The reason is that the curvature of the cable temples do not match the curvature of the user's ear. Individuals not only have different size ears, but different shaped ears. Also, the shape of an ear is not a smooth curve. Since the curvature of a cable temple is fixed, it cannot be easily contoured to the curvature of a user. Further, since cable temples "wrap around" the user's ear, they tend to exert pressure in some areas and are loose in other areas. Thus, the cable temples are not an adequate solution to this vexing problem.

Prior art eyeglasses, like those shown in U.S. Pat. No. 5,623,322, hereby incorporated by reference in its entirety, provide a pull down member ratchedly coupled to a temple through a split pin. The split pin allows the pull down member to be rotated with respect to the temple to a plurality of predefined positions thereby securing the glasses to the user at a desired location. However, as the pin is split thereby defining a gap, foreign objects, including a user's hair, may inadvertently enter and be retained in the gap defined by the split pin. Additionally, the pin is held within the temple through only frictional forces. A long period of use or the introduction of a lubricant, such as sweat for example, could decrease this frictional force and undesirably allow the pin to rotate within the temple when the pull down member is rotated. If the pin rotates along with the pull down member, the pull down member cannot be maintained in a desired position thus frustrating the intended purpose of the pull down member.

Therefore, there exists a need in the art for a pin which couples a pull down member to eyeglasses, that avoids the introduction of foreign objects and which will remain stationary while the pull down member is rotated.

SUMMARY OF THE INVENTION

In one aspect of the invention, an eyeglass frame comprises a lens frame adapted to accommodate at least one lens. A temple is attached to the lens frame, the temple has at least one hole formed therein. A pull down member has at least one hole formed therein. At least one of the holes formed in the temple and at least one of the holes formed in the pull down member are aligned to form a pin receiving passage having first and second openings. A pin extends through the pin receiving passage and cooperates with the pull down member to ratchedly couple the pull-down member to the temple. The pin includes a top portion covering the first opening, a plurality of legs extending from the top portion and a bottom portion covering the second opening.

In one feature of this aspect, the bottom portion of the pin includes a shoulder which matingly sits on a corresponding shelf surrounding the second opening.

In another feature of this aspect, the eyeglass frame further includes a projection extending from the pin and cooperating with the temple to prevent rotation of the pin relative to the temple.

In another distinctive feature of the invention, an eyeglass frame comprises a lens frame adapted to accommodate at least one lens. A temple is attached to the lens frame. The eyeglass frame further includes a pull down member. A pin extends through holes located in the temple and the pull down member and cooperates with the pull down member to ratchedly couple the pull-down member to the temple. The pin includes an alignment projection extending therefrom and cooperates with the temple to prevent the pin from rotating relative to the projection.

Other features and advantages of the present invention will become apparent from the following description of the invention which refers to the accompanying drawings.

DETAILED DESCRIPTION

DESCRIPTION OF THE PRIOR ART

Figure 1:
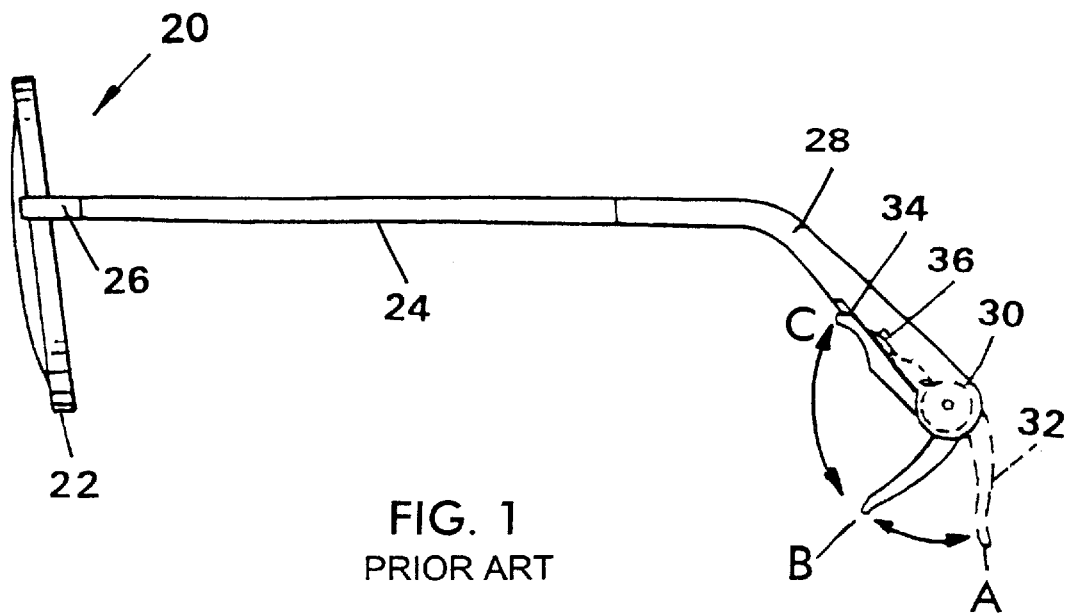
FIG. 1 is a side view of prior art eyeglasses having a pull-down member.
Figure 2:
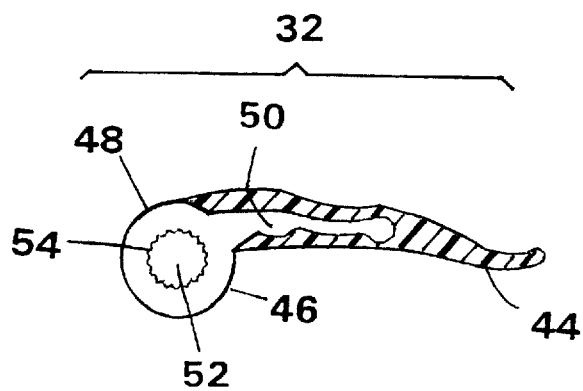
FIG. 2 is a side view of a prior art pull down member used in the eyeglasses of FIG. 1.

Referring to the drawings, wherein like numerals indicate like elements, FIG. 1 shows a pair of prior art eyeglasses 20 comprising a lens frame 22 for holding conventional or safety lenses, and a pair of temples 24 pivotally attached at a proximal end 26 to lens frame 22. Each temple has an end-piece 28 at a distal end 30. Referring also to FIG. 2, which shows the pin in accordance with the invention, an elongated pull-down member 32 is ratchedly and pivotally attached to each end-piece 28 at its distal end 30. Pull-down member 28 is typically made of a soft and pliant material, such as a soft plastic, and is positionable at different angles relative to end-piece 28 so as to snugly fit eyeglasses 20 to a wearer. While the pull-down member 30 touches a small area of the user's ear, it preferably does not wrap-around the ear which can be uncomfortable to the user.

Pull-down member 30 can be pivoted about distal end 30 to a plurality of positions. A maximum angular displacement of pull down member 30 with respect to end-piece 28 is shown at position A. An intermediate angular displacement of pull down member 30 with respect to end piece 28 is shown at position B. Pull-down member 30 can also be rotated completely into a recess 34 in end piece 28 when the pull-down member is not in use as shown in position C. When received in recess 34, pull-down member 30 is fully received therein, and may rest on the wearer's ear at one edge thereof. An arcuate recess 36 may be formed in recess 34 so as to aid the user in grasping pull-down member 30 when pull down member 30 is positioned within recess 34.

Referring to FIG. 2, pull-down member 32 includes an elongated appendage 44 attached to an edge 46 of a core 48. Core 48 is generally disk-shaped and is typically made of a hard plastic such as a polycarbonate plastic. Core 48 includes an appendage 50 which extends into the elongated appendage 44 so as to better secure core 48 to appendage 44. An opening 52 is centrally disposed in core 48 and is defined by a plurality of teeth 54 extending inwardly into opening 52.

Figure 3:
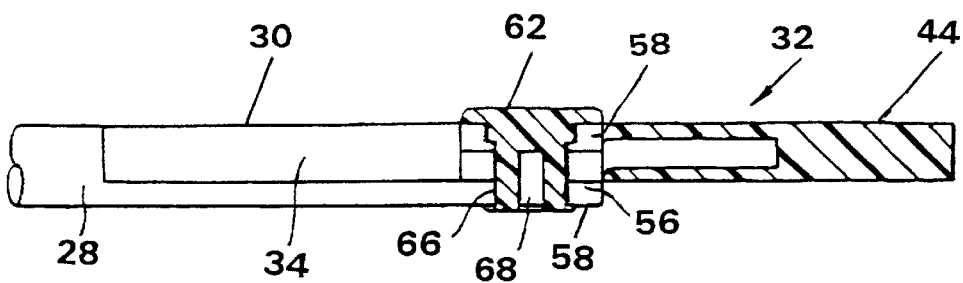
FIG. 3 is a bottom view of the prior art pull-down member coupled to a glasses temple using a prior art pin.

Referring to FIG. 3, the distal end of end piece 28 has two spaced-apart discs 58 formed thereon. Discs 58 define a disk-shaped opening 56 therebetween. Disc shaped opening 56 is effective to accommodate core 48 therein. Discs 58 each further have an opening at a central portion thereof. The openings within discs 58, along with opening 56 define a pin receiving passage 60, perpendicular to and communicating with opening 56.

When pull down member 32 is to be combined with end piece 28, core 48 is inserted into opening 56 and opening 52 of core 48 is aligned with pin receiving passage 60 of end piece 28. In the conventional structure, a split pin 62 is placed in pin receiving passage 60 so as to retain pull-down member 32 at distal end 30 of end-piece 28.

Figure 4:
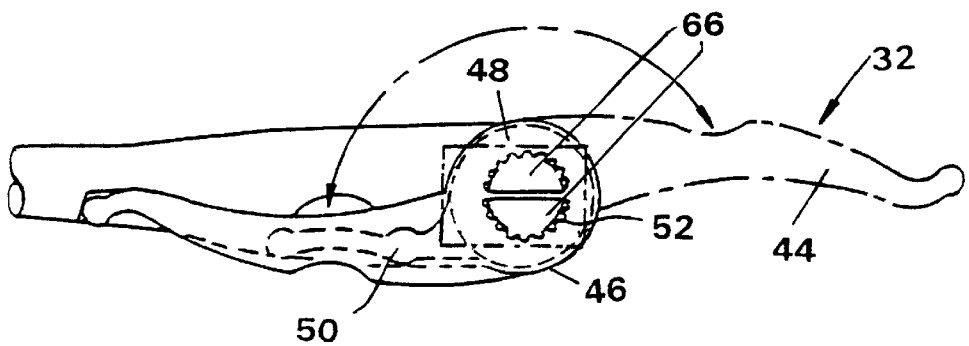
FIG. 4 is a side view showing the adjustment of the prior art pull-down member.
Figure 5:
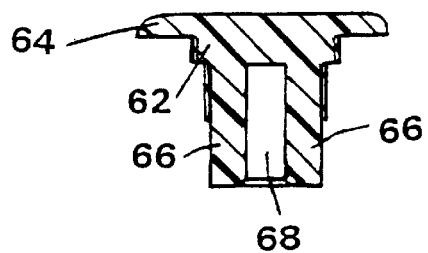
FIG. 5 is a side view of the prior art pin used to couple the prior art pull down member with a temple.
Figure 6:
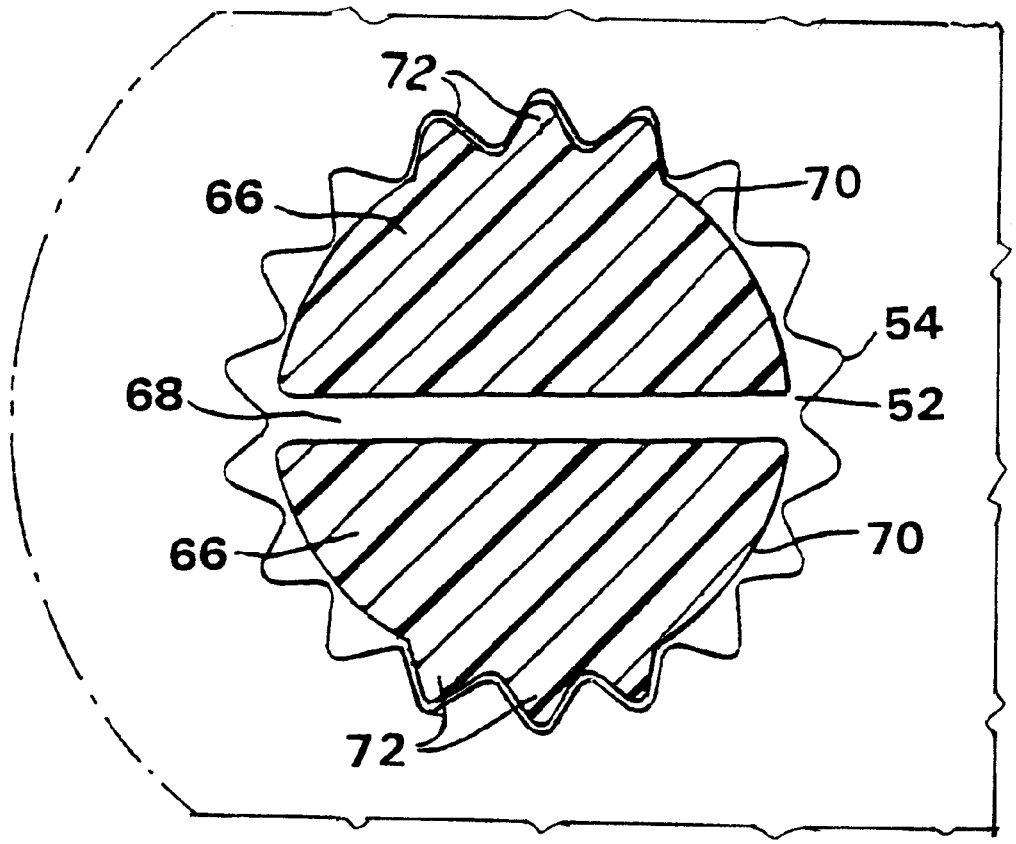
FIG. 6 is an enlarged, partially cross-sectional view showing the engagement of the prior art pin retaining the prior art pull down member.
Figure 7:
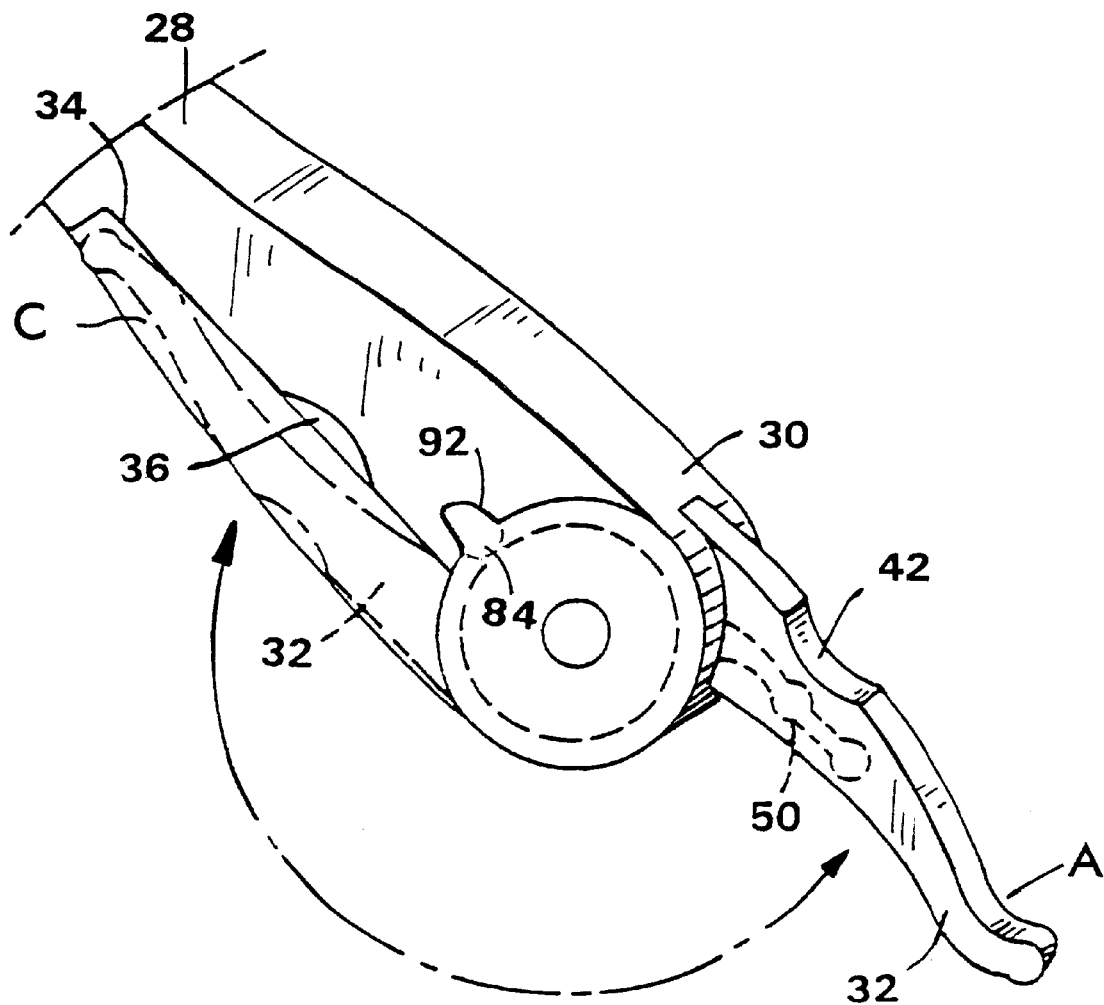
FIG. 7 is a perspective, enlarged view of a pull down member and pin used in accordance with the present invention.

As shown in FIGS. 4, 5, and 6 split pin 62 includes a flat portion 64 and two spaced apart legs 66 extending from flat portion 64 defining a gap 68 therebetween. Legs 66 have a cross-sectional configuration which is generally semi-circular. Extending along an outer surface 70 of each leg 66 are a series of teeth 72 which are mateable with teeth 54 disposed inside opening 52 of core 48.

When a user wishes to adjust pull down member 32, the user rotates pull down member 32 with respect to end piece 28 to a desired angular position. Once in the desired position, teeth 72 of split pin 62 engage teeth 54 of core 48 and retain pull down member 32 in that position relative to end piece 28. As the pull down member 32 is rotated, teeth 52 and 72 will alternatively mesh and separate in a ratchet like manner under the radially outward force of the legs 66. Once the application of the rotational force ceases, teeth 52 and 72 mesh and lock the pull-down member 32 in the desired position.

This prior art pin structure has some disadvantages. First, gap 68 may receive and retain undesired foreign objects including a user's hair. Second, the adjustment of pull down member 32 is based upon split pin 62 being frictionally held within pin receiving passage 60. If this frictional force is weakened due to use, time, or a lubricant such as sweat, split pin 62 may begin to rotate along with pull down member 32 instead of being ratchedly coupled to pull down member 32. This would frustrate reliable adjustment and positioning of pull down member 32.

DESCRIPTION OF THE PREFERRED EMBODIMENT

Figure 8A:
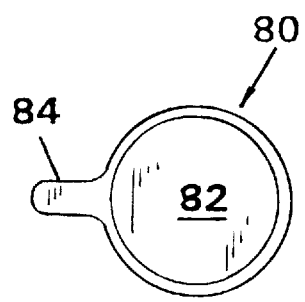
FIG. 8A is a top view of a pin in accordance with the invention.
Figure 8B:
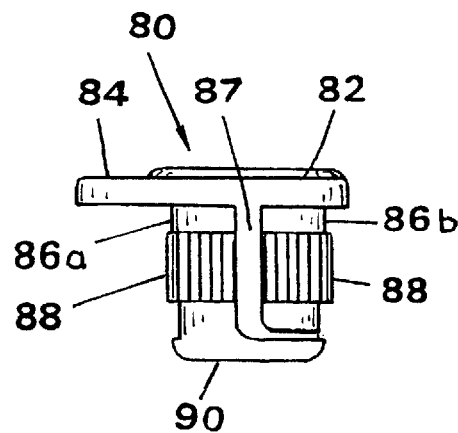
FIG. 8B is a side view of the pin in accordance with the invention.

Referring now to FIGS. 8A and 8B, there is shown a pin 80 in accordance with the invention. Pin 80 includes a top portion 82 having an alignment projection 84 extending therefrom. As with the prior art pin, two legs 86a and 86b extend downwardly from top portion 82 and define a slit like gap 87 therebetween. Both legs 86a and 86b are semicircular in cross-section and have teeth 88 extending radially outwardly therefrom. Teeth 88 are effective to ratchedly engage teeth 54 of pull down member 32 as with the prior art pin. Leg 86a terminates in a protective tab 90 extending substantially parallel to top portion 82 and having a cross section that is substantially round.

Referring to FIGS. 7–10, when pin 80 is to be inserted into opening 60 of end piece 28, legs 86a and 86b are bent toward one another thereby decreasing the size of gap 87. Pin 80 is pushed through a first side of pin receiving passage 60 while the interior walls which define pin receiving passage 60 maintain the decreased size of gap 87. Pin 80 is continually pushed through pin receiving passage 60 until protective tab 90 passes through to a second side of pin receiving passage 60. Now legs 86a, 86b move outwardly and allow gap 87 to resume its original shape. At this point, alignment projection 84 rests within a recess 92 of distal end 30. (See FIGS. 2 and 10).

Figure 9:
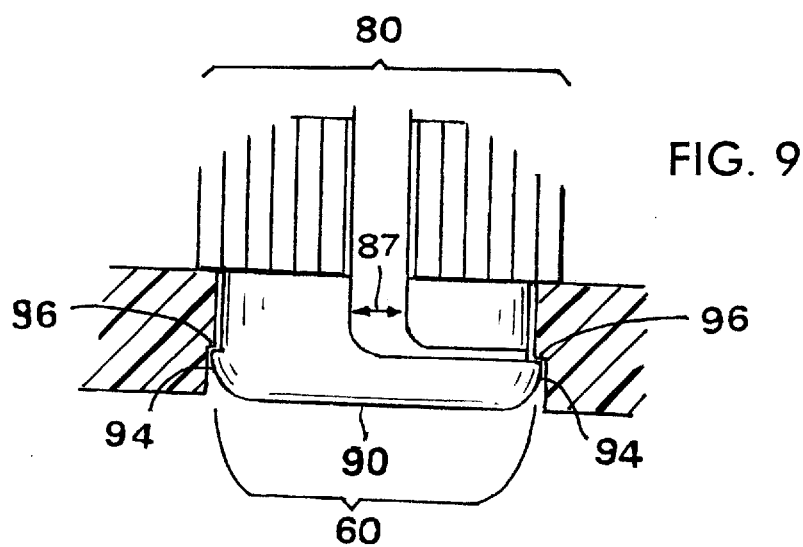
FIG. 9 is an enlarged cross-sectional view of the pin used in accordance with the invention when the pin is retained in an opening of a temple.
Figure 10:
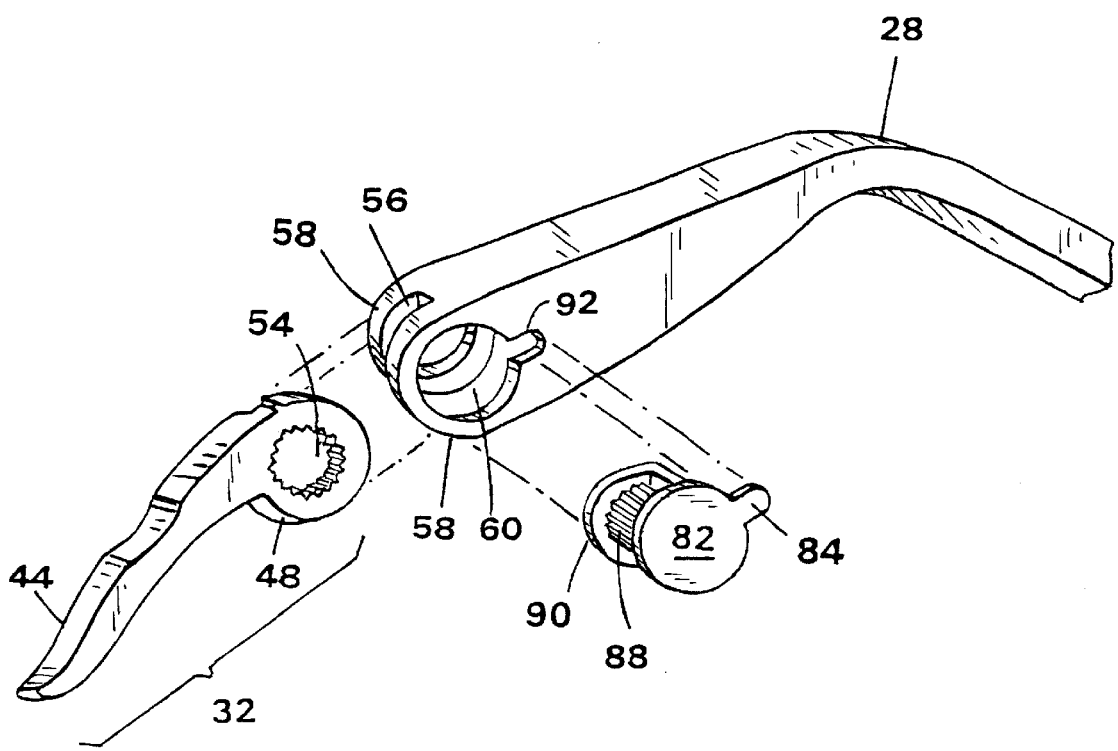
FIG. 10 is a perspective exploded view showing the coupling of a pull-down member and a temple using a pin in accordance with the invention.

FIG. 9 shows pin 80 inserted into pin receiving passage 60 of end piece 28. As can be seen in the figure, protective tab 90 preferably includes, on its perimeter, a shoulder 94. The walls which define pin receiving passage 60, have corresponding shelf portions 96 extending inwardly. When pin 80 is inserted completely into pin receiving passage 60, shelf portions 96 retain pin 80 within pin receiving passage 60 by engaging with shoulders 94. Protective tab 90 thus completely covers all of pin receiving passage 60 of end piece 28.

When a user desires to adjust pull down member 32 with respect to end piece 28, pull down member 32 is rotated with respect to end piece 28 as with the prior art device. However, there is little concern of pin 80 losing frictional engagement with end piece 28, as alignment projection 84 ensures that pin 80 cannot be rotated with respect to end piece 28. The engagement of alignment projection 84 with recess 92 prevents undesired rotation of pin 80 while pull down member 32 is rotated.

Thus, by providing an alignment projection on a first side of a pin which couples a pull down member with an end piece, reliable engagement of the pin with the end piece is ensured even while the pull down member is rotated. Further, by providing a protective tab on a second side of the pin, the opening which receives the pin is completely covered and protected from foreign objects such as a user's hair.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An eyeglass frame comprising:
a lens frame adapted to accommodate at least one lens;
a temple attached to said lens frame, said temple having at least one hole formed therein;
a pull down member having at least one hole formed therein, at least one of said holes formed in said temple and at least one of said holes formed in said pull down member being aligned to form a pin receiving passage having first and second openings;
a pin extending through said pin receiving passage and cooperating with said pull down member to ratchedly couple said pull-down member to said temple, said pin including a top portion covering said first opening, a plurality of legs extending from said top portion and a bottom portion covering said second opening.

2. The eyeglass frame as claimed in claim 1, wherein said bottom portion is coupled to one of said legs.

3. The eyeglass frame as claimed in claim 2, wherein said plurality of legs include first and second legs having a slit like space therebetween and wherein said top and bottom portions prevent foreign objects from entering said pin receiving passage and entering said slit like space.

4. The eyeglass frame as claimed in claim 1, wherein said pull down member is moveable among a discrete series of positions relative to said temple.

5. The eyeglass frame as claimed in claim 1, wherein a distal end of said temple has a disc like opening in which a portion of said pull down member is located, said pin receiving passage being defined by openings formed in said distal end of said temple and an opening formed in said portion of said pull down member located in said disc like opening of said temple.

6. The eyeglass frame as claimed in claim 1, wherein said legs have ridges formed on radially outward portions thereof and wherein said opening in said temple have ridges formed in radially inward sections thereof, said ridges mating with one another.

7. The eyeglass frame as claimed in claim 6, wherein said legs are biased radially outwardly relative to said ridges.

8. The eyeglass frame as claimed in claim 1, wherein said bottom portion of said pin includes a shoulder which matingly sits on a corresponding shelf surrounding said second opening.

9. The eyeglass frame as claimed in claim 8, wherein said bottom portion is circular in shape and has a diameter which is greater than a diameter of said pin receiving passage and wherein said bottom portion of said pin is flexible so that said pin can be pushed through said pin receiving passage and snap fit into engagement with said shelf.

10. The eyeglass frame as claimed in claim 1, further including a projection extending from said pin and cooperating with said temple to prevent rotation of said pin relative to said temple.

11. The eyeglass frame as claimed in claim 10, wherein said projection extends radially outward from said pin.

12. The eyeglass frame as claimed in claim 11, wherein said projection sits in a mating slot formed in said temple.

13. The eyeglass frame as claimed in claim 12, wherein said projection extends from said top portion of said pin.

14. The eyeglass frame as claimed in claim 13, wherein said projection is formed integrally with said pin.

15. The eyeglass frame as claimed in claim 1, wherein said pin is made of an elastic material.

16. The eyeglass frame as claimed in claim 15, wherein said elastic material is plastic.

17. An eyeglass frame comprising:
a lens frame adapted to accommodate at least one lens;
a temple attached to said lens frame;
a pull down member;
a pin extending through holes located in said temple and said pull down member and cooperating with said pull down member to ratchedly couple said pull-down member to said temple, said pin including an alignment projection extending therefrom and cooperating with said temple to prevent said pin from rotating relative to said projection.

18. The eyeglass frame as claimed in claim 17, wherein:
said temple further includes a recess; and said alignment projection mates with said recess to prevent said pin from rotating relative to said temple.

19. The eyeglass frame as claimed in claim 17, wherein said pin is made of an elastic material.

20. The eyeglass frame as claimed in claim 19, wherein said elastic material is plastic.

21. The eyeglass frame as claimed in claim 17, wherein said pull down member is moveable among a discrete series of positions relative to said temple.

22. The eyeglass frame as claimed in claim 17, wherein said pin includes a top portion and a plurality of legs extending from said top portion.

23. The eyeglass frame as claimed in claim 22, wherein:
   said legs have ridges formed on radially outward portions thereof; and
   said hole in said temple has ridges formed in radially inward sections thereof, said ridges mating with one another.

24. The eyeglass frame as claimed in claim 23, wherein said legs are biased outwardly.

25. The eyeglass frame as claimed in claim 22, wherein said pin includes a bottom portion coupled to one of said legs.

26. The eyeglass frame as claimed in claim 25, wherein:
   said bottom portion is circular in shape and has a diameter which is greater than a diameter of said holes of said temple and pull down member; and
   said bottom portion is flexible so that said pin can be pushed through said holes.

* * * * *